Sept. 15, 1936. A. COPONY 2,054,614
TRIPOD TOP FOR CAMERAS OR THE LIKE
Filed Feb. 15, 1934
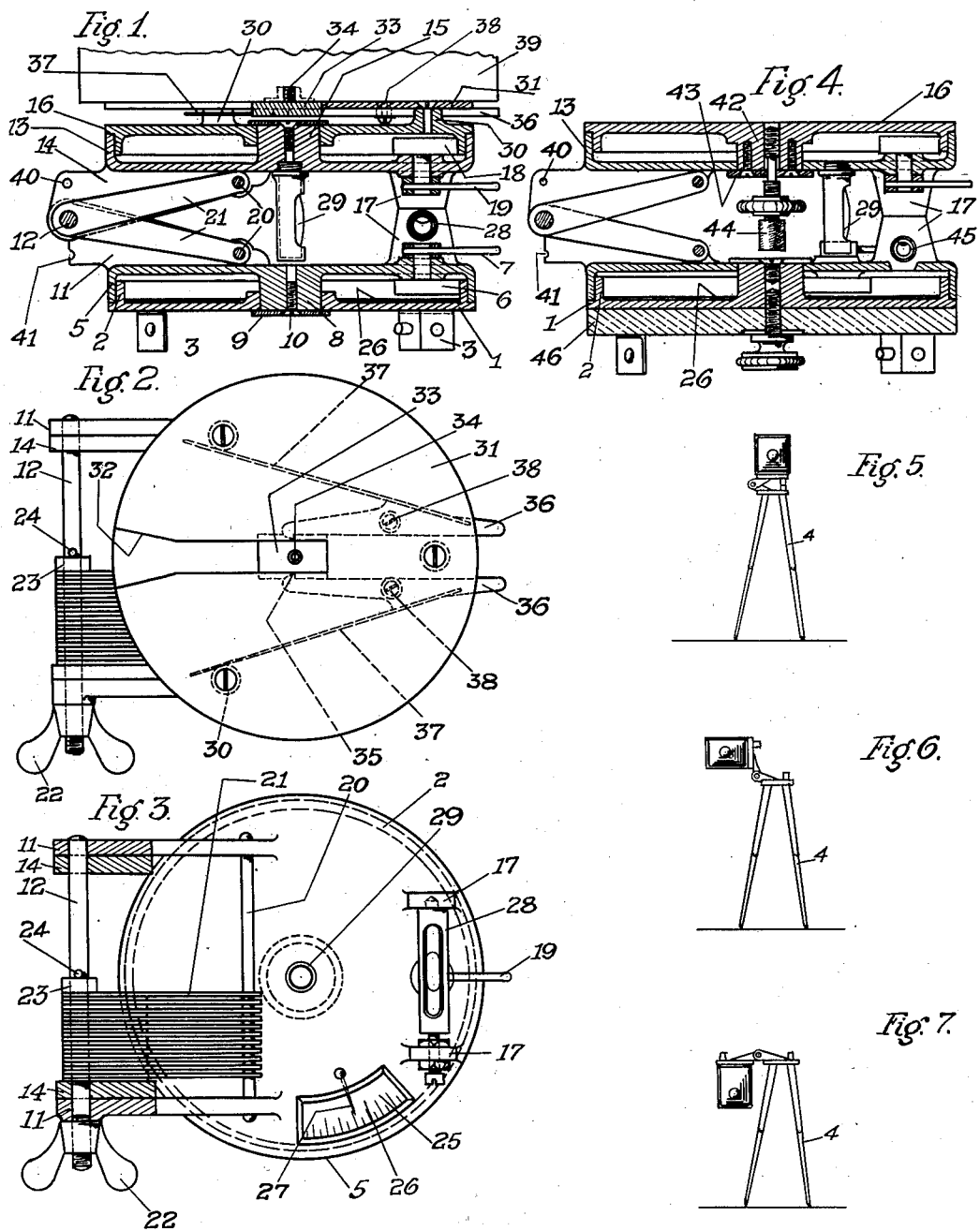
Alfred Copony
Inventor Patented Sept. 15, 1936

2,054,614

UNITED STATES PATENT OFFICE 2,054,614

TRIPOD TOP FOR CAMERAS OR THE LIKE

Alfred Copony, Mount Clemens, Mich.

Application February 15, 1934, Serial No. 711,309

3 Claims. (Cl. 248—183)

My invention relates to an adjustable top which permits the adjustment of a camera in any inclined or normal position when in use and also permits complete reversal of the camera in order to make use of the longer travel or adjustment of the lens board in architectural photography where parallel vertical or horizontal lines have to be represented correctly.

My top can also be used in connection with a sextant, it permits correct horizontal adjustment for the measurement of horizontal angles, while adjustment for vertical angles can be made accurately and with dispatch.

Another valuable feature of my tripod top consists in an arrangement by which the camera can be fastened to the top without the use of the customary tripod set screw and providing thereby instantaneous means for fastening.

Other advantages will appear in the course of the specification.

In the drawing:—

Figure 1 shows a vertical cross section through the tripod top with the legs of the tripod removed.

Figure 2 is a top view of my tripod top.

Figure 3 is a horizontal cross section through the hinge pin of Figure 1.

Figure 4 is a vertical cross section through another form of my tripod top.

Figure 5 is a schematic drawing of my tripod with a camera attached.

Figure 6 shows a schematic drawing of my tripod with the camera attached in a horizontal position, while Figure 7 shows a schematic drawing of my tripod with the camera reversed.

In Figure 1 a round base plate 1 with turned up rim 2 made of aluminum or any other light material, is equipped on its under surface with brackets 3 adapted to engage tripod legs 4, Figures 5, 6 and 7, in the standard way. Encircling base plate 1 a lower turntable 5 is provided which can be revolved around the vertical axis of base plate 1 and is lockable in relation to the latter by means of an eccentric 6 fastened to lower turntable 5 and which can be operated by eccentric lever 7. Turntable 5 is equipped at its central portion with a pivot 8, a washer 9 and a screw 10 thereby permitting a permanent engagement of base plate 1 to its turntable 5. At the left hand side of Figure 1, hinge lugs 11 are provided which furnish bearing for a hinge shaft or pin 12. The top part of my tripod top is somewhat similarly designed and consists of a turntable support 13 connected to shaft 12 by means of hinge lugs 14 and has a central hub 15 which engages upper turntable 16. Turn table 5 and turntable support 13 are equipped with spacer lugs 17 which permit permanent parallel adjustment of the upper and lower turntables when the hinge is closed. Upper turntable plate 16 can also be locked to turntable support 13 by means of eccentric 18 and eccentric lever 19. Parallel to hinge shaft 12 and in fixed spaced relation thereto two auxiliary shafts 20 are mounted in the hinge lugs 11 and 14 respectively. They provide support for friction links 21 which connect alternately hinge shaft 12 with the upper turntable support 13 and lower turntable 5. Friction links 21 and auxiliary shafts 20 remain at all times stationary in relation to their respective plates, only a hinging action of links 21 will take place on hinge shaft 12 when the upper turntable is tilted. Hinge shaft 12 is equipped at one end with a thumb nut 22 which screws onto the shaft and permits slight movement of shaft 12 in an axial direction. Shaft 12 is provided with a pressure washer 23 which can be locked in position by pressure pin 24. See Figures 2 and 3. Turntable 5, Figure 3, is equipped with a sight hole 25 which permits observation of a graduated paper disk 26 located between 5 and 1 and fastened to base plate 1. An index pin 27 permits adjustment of turntable 5 in relation to base plate 1 by degrees when the camera is employed in panoramic work. Between spacer lugs 17, Figure 1 and Figure 3, a level 28 is mounted so that turntable 5 and the whole tripod therewith can be set level before use. Another level 29, Figure 1, permits adjustment of the upper turntable assembly for a vertical position, when the camera is used in that position in relation to the tripod, and is screwed into turntable support 13 for this purpose. Upper turntable 16 carries on its upper surface three teats 30 which are an integral part of upper turntable 16 and which provides support for face plate 31 to which it is fastened by countersunk screws, and is in parallel position to upper turntable 16 and thereby to turntable 5 which governs horizontal levels. A slot 32 Figure 2, is provided in surface plate 31 extending from the central portion of surface plate 31 towards the outside edge where it widens slightly. A screw plate 33 provides support and connection for camera screw 34 and can be held by means of notches 35, Figure 2, in the former, in a fixed position in relation to surface plate 31 by employing locking levers 36 which are held under locking tension by springs 37 bearing against two of the teats 30. Locking levers 36 are mounted by means of riveted pins and screws 38 to the lower surface of plate 31.

In use the tripod is set level by means of level 28 which is accomplished by revolving turntable 5 alternately one quarter turn until a level position has been reached by adjustment of the tripod legs. As camera screw 34 and screw plate 33 have been previously permanently attached and securely screwed into tripod socket of camera 39, it only requires sliding the camera along surface plate 31 thereby engaging screw plate 33 with the under edge of slot 32 in surface plate 31. As soon as the limit of the slot has been reached by screw plate 33, levers 36 immediately engage the screw plate by means of the notches in the latter and hold it in fixed relation to the surface plate 31. If adjustment of the camera in a horizontal plane is required it is easily accomplished by releasing eccentric 6 and revolving the camera with the whole upper structure of my tripod top around base plate 1 until the desired position is attained, whereupon locking of base plate 1 and turntable 5 by means of eccentric 6 holds the camera in fixed relation to the tripod and objective. If the longer side of the plate in a camera is required to be used as a base line, Figure 6, we release thumb nut 22, by which tension on pressure pin 24 and pressure washer 23 is relieved, the camera can be swung into position and adjusted with the short side exactly vertical by use of vertical level 29 which then comes into play. As soon as this level position is reached, tightening of nut 22 will exert pressure by means of hinge shaft 12 on pressure pin 24 and pressure washer 23 thereby drawing the plurality of friction links 21, alternately connecting with turntables 5 and 13 tight, until the friction created thereby will be sufficient to hold the camera in a permanently locked position. Any intermediate position between the vertical and the horizontal can be attained in a similar way. Should it be desirable to reverse the camera in order to make use of the increased range of travel of the lens board in an upward direction the camera can easily be reversed as shown in Figure 7. In this case stop pin 40 in upper hinge lug 14 will drop into a stop pin groove 41 in lower hinge lug 11. When the camera is in a position as indicated by Figure 6 it can be revolved vertically by means of turntable element 16 on 13 and locked in position by eccentric 18 and locking lever 19.

A modification of my invention is shown in Figure 4, where upper turntable 16 is supplied with a central pivot 42 to which a retaining plate 43 is screwed, which is also threaded centrally and provides a footing for the customary camera fastening 44. Another deviation from the design shown in Figure 1 is shown in level 45 mounted between spacer lugs 17, in that the former has a sight opening on the top and bottom, thereby permitting use of the lens like enlarging action of that portion of the level which is solidly filled with liquid for use as magnifying means in reading the graduated paper disk 26 which will be used principally for landscape work.

For use in connection with sextants in exploration work, the hand hold of the sextant is replaced by a screw socket thereby permitting use of this instrument for the measurement of horizontal and vertical angles in connection with my tripod thereby attaining an increase of accuracy.

Other variations of my device can be employed without departing from the spirit of my invention. I could dispense with the thumb nut 22 by increasing the number of friction links 21 and substituting as pressure element a coil spring mounted on shaft 12 and between pressure pin 24 and hinge 14, to exert the required pressure for holding the top in position, as an increase of friction links 21 would permit corresponding reduction of pressure, so that thumb pressure alone would suffice when applied to the end of shaft 12 where thumb nut 22 is now located, to release pressure for movement.

Having thus described my invention, what I claim as my own is:—

1. In a tripod mounting for scientific instruments, the combination of a base member adapted to engage the legs of a tripod, an instrument carrying member adapted to engage a scientific instrument, hinge lugs on said base member and instrument carrying member adapted to engage a hinge pin, a hinge pin, a plurality of friction plates engaging said hinge pin and alternately engaging said base member and instrument carrying member, a pressure ring on said hinge pin, and means on said hinge pin to shift said hinge pin laterally until said pressure ring engages and compresses said plurality of friction plates against one pair of said hinge lugs.

2. In a tripod mounting for scientific instruments, the combination of a bottom plate adapted to engage the legs of a tripod, a top plate adapted to engage a scientific instrument, a bottom hinge plate adapted to engage said bottom plate, a top hinge plate adapted to engage said top plate, a hinge pin adapted to engage said top and bottom hinge plates, a plurality of friction plates alternately engaging said top and bottom hinge plates and said hinge pin, a pressure ring on said hinge pin, and means on said hinge pin to shift said hinge pin laterally until said pressure ring engages and compresses said plurality of friction plates.

3. In a tripod mounting for scientific instruments, the combination of a bottom plate adapted to engage the legs of a tripod, a top plate adapted to engage a scientific instrument a bottom hinge plate adapted to engage said bottom plate, a top hinge plate adapted to engage said top plate, a locking means adapted to lock said bottom plate to said bottom hinge plate, a locking means adapted to lock said top plate to said top hinge plate, a hinge pin adapted to engage said top and bottom hinge plates, a plurality of friction plates alternately engaging said top and bottom hinge plates and said hinge pin, a pressure ring on said hinge pin, and means on said hinge pin to shift said hinge pin laterally until said pressure ring engages and compresses said plurality of friction plates.

ALFRED COPONY.